United States Patent
Garrett et al.

(10) Patent No.: US 8,140,958 B2
(45) Date of Patent: Mar. 20, 2012

(54) CYCLICAL AND SYNCHRONIZED MULTI-SOURCE SPREADSHEET IMPORTS AND EXPORTS

(75) Inventors: Andrew J. Garrett, Herts (GB); James A. Martin, Jr., Endicott, NY (US); Jeffrey E. Prince, Bloomfield Hills, MI (US)

(73) Assignee: International Business Machines Corporation, Armonk, NY (US)

( * ) Notice: Subject to any disclaimer, the term of this patent is extended or adjusted under 35 U.S.C. 154(b) by 1070 days.

(21) Appl. No.: 11/668,698

(22) Filed: Jan. 30, 2007

(65) Prior Publication Data
US 2008/0189597 A1  Aug. 7, 2008

(51) Int. Cl.
*G06F 17/00* (2006.01)

(52) U.S. Cl. ........ 715/212; 715/203; 715/215; 715/219; 715/220; 709/202; 709/203; 709/242

(58) Field of Classification Search .................. 715/234, 715/236, 237, 203, 212, 215, 219, 220; 709/202, 709/203, 242
See application file for complete search history.

(56) References Cited

U.S. PATENT DOCUMENTS

| | | | | |
|---|---|---|---|---|
| 5,293,615 | A * | 3/1994 | Amada | 1/1 |
| 5,893,123 | A | 4/1999 | Tuinenga | |
| 6,256,651 | B1 * | 7/2001 | Tuli | 715/224 |
| 6,490,600 | B1 * | 12/2002 | McGarry | 715/201 |
| 6,718,351 | B2 | 4/2004 | Sellen et al. | |
| 7,017,112 | B2 * | 3/2006 | Collie et al. | 715/212 |
| 7,139,748 | B1 | 11/2006 | Mills et al. | |
| 7,225,189 | B1 * | 5/2007 | McCormack et al. | 1/1 |
| 7,546,286 | B2 * | 6/2009 | Dickinson et al. | 1/1 |
| 7,574,483 | B1 * | 8/2009 | Alger et al. | 709/217 |
| 7,593,751 | B2 * | 9/2009 | Barbosa et al. | 455/556.1 |
| 7,756,824 | B2 * | 7/2010 | Campbell et al. | 707/610 |
| 2001/0056440 | A1 | 12/2001 | Abramson et al. | |
| 2005/0021866 | A1 * | 1/2005 | Kang et al. | 709/248 |
| 2005/0034058 | A1 * | 2/2005 | Mills et al. | 715/503 |
| 2006/0026501 | A1 | 2/2006 | Anthony et al. | |
| 2006/0248443 | A1 | 11/2006 | Bagheri | |
| 2008/0256432 | A1 * | 10/2008 | Sambandam et al. | 715/212 |
| 2008/0288889 | A1 * | 11/2008 | Hunt et al. | 715/810 |
| 2009/0216602 | A1 * | 8/2009 | Henderson | 705/9 |

* cited by examiner

*Primary Examiner* — Stephen S. Hong
*Assistant Examiner* — Matthew Ludwig
(74) *Attorney, Agent, or Firm* — William Schiesser; Hoffman Warnick LLC

(57) ABSTRACT

A system, method and program product for synchronizing spreadsheet data. A system is provided having: a scheduling system for scheduling a first import time, a second import time, a first export time and a second export time; an import system for obtaining a first spreadsheet from a first entity at the first import time, and for obtaining a second spreadsheet from a second entity at the second import time; a synchronization system for synchronizing the first spreadsheet and the second spreadsheet to obtain a first revised spreadsheet and a second revised spreadsheet; and an export system for providing the first revised spreadsheet to the first entity at the first export time, and for providing the second revised spreadsheet to the second entity at the second export time.

18 Claims, 2 Drawing Sheets

FIG. 2

CYCLICAL AND SYNCHRONIZED MULTI-SOURCE SPREADSHEET IMPORTS AND EXPORTS

FIELD OF THE INVENTION

Aspects of the invention relate generally to managing spreadsheet data, and relate more particularly to a system and method for synchronizing data from multiple spreadsheets.

BACKGROUND OF THE INVENTION

Large scale projects often require the dissemination of data to and from many different sources. For example, management of a large scale information technology (IT) project involving many different sites may require the tracking of requirements and progress at each site by multiple entities. In such an example, multiple vendors may be involved to provide different services, e.g., hardware installation, network administration, testing, etc., at the various sites. Tasks, dates, costs, etc., for activities performed by the different vendors must be tracked and synchronized to ensure an efficient project flow, e.g., testing by a vendor should not be scheduled and performed until all the systems at the site are installed by the other vendors. Logistical challenges can however arise when attempting to collect and synchronize significant amounts of data from many different entities.

One possible solution is to provide a database application through which each of the different entities could view and input data. One of the logistical challenges with such a solution however is the fact that importing and exporting data to a database application, such as DB2®, requires a fairly high level of sophistication on the part of the users. Although such applications can provide a powerful solution, their operation is generally not widely understood by most people. Thus, a traditional database approach may lack the flexibility and ease-of-use that is required by entities inputting and viewing the data.

The use of spreadsheets provides a potential solution that addresses the flexibility and ease-of-use issues that database applications often suffer from. Spreadsheet applications, such as EXCEL®, are widely used and understood by people in almost all industries (EXCEL is a trademark of Microsoft Corporation in the United States, other countries, or both). Accordingly, spreadsheets can potentially provide an excellent tool for inputting, viewing and managing data. However, one of the challenges of using spreadsheets in a large-scale project is that each different entity will typically utilize its own spreadsheet, and data from different spreadsheets must be regularly synchronized (i.e., data from cells in a first spreadsheet must be copied to cells in another spreadsheet). Moreover, for purposes such as efficiency or confidentiality, not all of the entities may be given access to the same data. Thus, it may be desirable to limit access (e.g., read-write, read, none) to different sets of data for each different entity. Accordingly, each entity may require its own unique and editable spreadsheet, in terms of both format and data. Synchronizing such spreadsheets is thus not a trivial process. However, given the flexibility and ease of use of spreadsheet applications, a need exists for a system that can automate the synchronization process among disparate spreadsheets.

SUMMARY OF THE INVENTION

Aspects of the present invention address the above-mentioned problems, as well as others, by providing a system and method for synchronizing data from a plurality of disparate spreadsheets.

In a first aspect, the invention provides a method for synchronizing spreadsheet data, comprising: obtaining a first spreadsheet at a predetermined first import time; obtaining a second spreadsheet at a predetermined second import time; synchronizing the first spreadsheet with the second spreadsheet to obtain a first revised spreadsheet and a second revised spreadsheet; providing the first revised spreadsheet to a first entity at a predetermined first export time; and providing the second revised spreadsheet to a second entity at a predetermined second export time.

In a second aspect, the invention provides a system for synchronizing spreadsheet data, comprising: a scheduling system for scheduling a first import time, a second import time, a first export time and a second export time; an import system for obtaining a first spreadsheet from a first entity at the first import time, and for obtaining a second spreadsheet from a second entity at the second import time; a synchronization system for synchronizing the first spreadsheet and the second spreadsheet to obtain a first revised spreadsheet and a second revised spreadsheet; and an export system for providing the first revised spreadsheet to the first entity at the first export time, and for providing the second revised spreadsheet to the second entity at the second export time.

In a third aspect, the invention provides a computer program product stored on a computer readable medium for synchronizing spreadsheets, comprising: program code configured for scheduling a first import time, a second import time, a first export time and a second export time; program code configured for importing a first spreadsheet at the first import time, and for obtaining a second spreadsheet at the second import time; program code configured for synchronizing the first spreadsheet and the second spreadsheet to obtain a first revised spreadsheet and a second revised spreadsheet; and program code configured for exporting the first revised spreadsheet to the first entity at the first export time, and for providing the second revised spreadsheet to the second entity at the second export time.

In a fourth aspect, the invention provides a method for deploying a system for synchronizing spreadsheet data, comprising: providing a computer infrastructure being operable to: schedule a first import time, a second import time, a first export time and a second export time; import a first spreadsheet at the first import time; import a second spreadsheet at the second import time; synchronize the first spreadsheet and the second spreadsheet to obtain a first revised spreadsheet and a second revised spreadsheet; export the first revised spreadsheet to the first entity at the first export time; and export the second revised spreadsheet to the second entity at the second export time.

BRIEF DESCRIPTION OF THE DRAWINGS

These and other features of this invention will be more readily understood from the following detailed description of the various aspects of the invention taken in conjunction with the accompanying drawings in which:

FIG. 2 depicts an illustrative spreadsheet in accordance with an embodiment of the present invention.

DETAILED DESCRIPTION OF THE INVENTION

Figure 1:
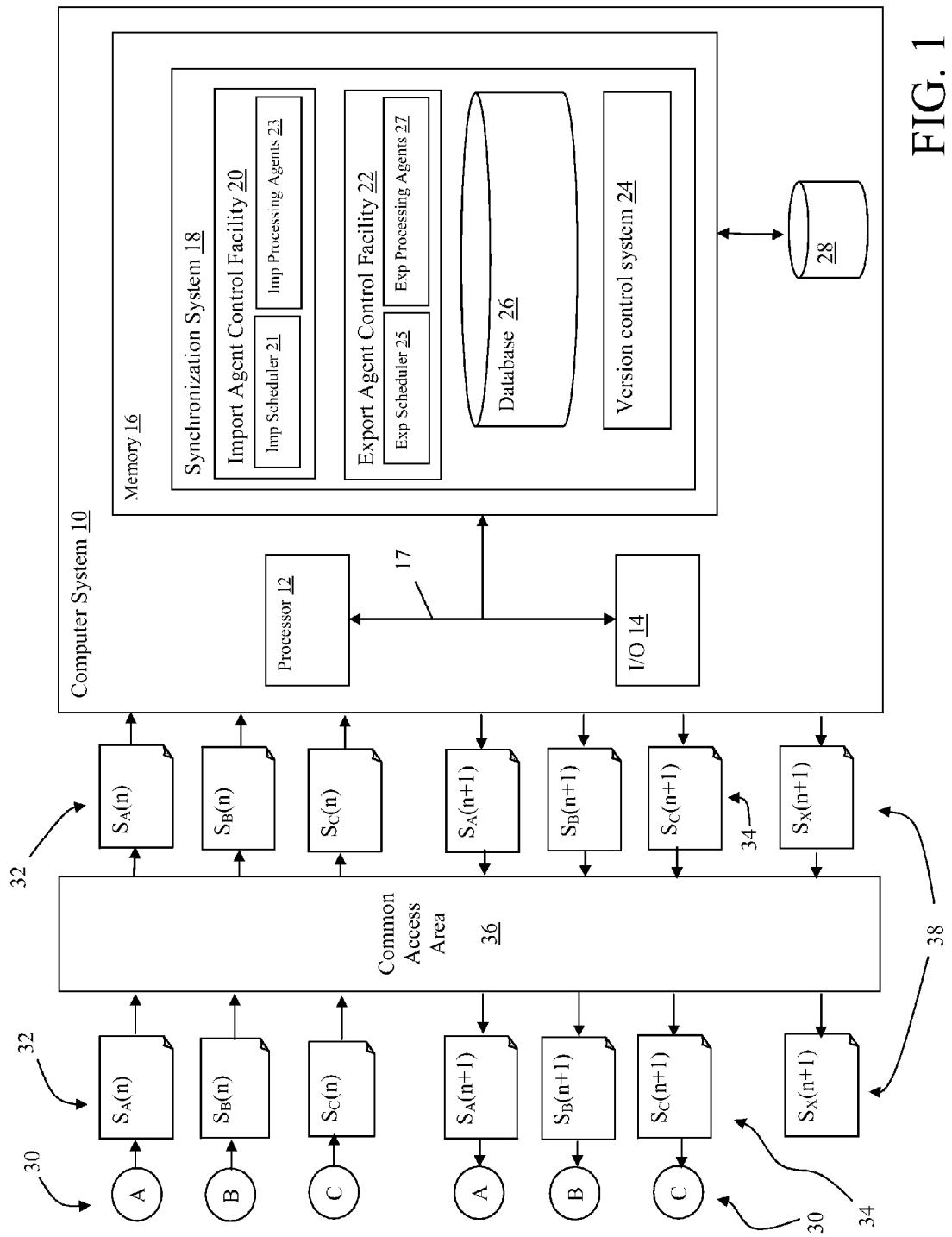
FIG. 1 depicts a system for synchronizing data from a plurality of spreadsheets in accordance with an embodiment of the present invention.

Referring now to the drawings, FIG. 1 depicts an illustrative system and methodology for synchronizing spreadsheet data amongst a plurality of spreadsheets. In this illustrative system, each of a plurality of entities 30, A, B, C, maintains its own unique spreadsheet 32, $S_A(n)$, $S_B(n)$, $S_C(n)$, respectively. While FIG. 1 describes an embodiment using three entities/spreadsheets, it is understood that any number of entities/spreadsheets could be utilized. In addition, spreadsheets 32 may be implemented using any known spreadsheet application. In general, the data and data format in each spreadsheet 32 is tailored to the needs of each entity 30, such that the data for one entity may be different than the data for another entity. Thus, some data may be shared among the different entities 30 and some data may not be shared, or just shared by a subset of the entities 30. For example, a lead project manager may have a master spreadsheet showing all of the data, while different vendors and subcontractors only see portions of the entire data set that are relevant to their tasks.

As noted above, one of the challenges of utilizing multiple disparate spreadsheets involves efficiently synchronizing data from the different spreadsheets. For example, a task start date for Company A may depend on the expected completion date of another task by Company B. Thus, if Company B edits its spreadsheet to change its expected completion date, that information needs to get into Company A's spreadsheet so that a new task start date for Company A can be calculated.

To address this, the present embodiment utilizes a synchronization system 18 having an import agent control facility 20, an export agent control facility 22 and a database 26. Import agent control facility 20 includes: (1) an import (Imp) scheduler 21 for scheduling the import of spreadsheets 32 from a common access area 36, and (2) a set of import processing agents 23 that pull relevant data from each spreadsheet 32 and load the data into database 26. Import scheduler 21 is configured to take into account which spreadsheets contain data that depend on others. Thus for example, if spreadsheet $S_B(n)$ depends on data from spreadsheet $S_A(n)$, then $S_A(n)$ is scheduled to be imported first. Similarly, if spreadsheet $S_C(n)$ depends on data from spreadsheet $S_B(n)$, then $S_B(n)$ is scheduled to be imported second. Thus, when spreadsheet $S_B(n)$ gets imported, spreadsheet $S_B(n)$ can be updated with data from $S_A(n)$; and when spreadsheet $S_C(n)$ gets imported, spreadsheet $S_C(n)$ can be updated with data from $S_B(n)$.

Import processing agents 23 determine what data from each given spreadsheet 32 should be imported. As noted, a given entity 30 may be provided with a spreadsheet that shows data that it manages and data that other entities manage. In a typical scenario, only the data that the entity manages needs to be imported. Thus, data not managed by the entity is not imported. A useful result of this is that if an entity accidentally changes a data value in its spreadsheet that it does not manage, then that entry will not get imported and will not adversely affect the synchronization process. Moreover, the inadvertent error will not appear in the revised spreadsheet.

Determining which data values need to be imported from a given spreadsheet 32 can be done in any manner. In one illustrative embodiment, each spreadsheet 32 includes control information, such as hard coded control language statements, that can be interpreted by an import processing agent 23 to determine which columns and/or rows in the spreadsheet 32 should be imported. An example of this is described below in FIG. 2. In general, each spreadsheet 32 has an associated import processing agent for importing and synchronizing data.

Once all of the data from each of the spreadsheets 32 is imported into database 26 and processed, export agent control facility 22 is utilized to rebuild and export revised spreadsheets 34, $S_A(n+1)$, $S_B(n+1)$, $S_C(n+1)$, back to common access area 36. In an illustrative embodiment, spreadsheets are cyclically updated each night, so that every morning a revised spreadsheet 34 is available to each entity 30. Export agent control facility 22 similarly includes an export (Exp) scheduler 25 and export processing agents 27. Export scheduler 25 determines what time each revised spreadsheet 34 is to be exported and export processing agents 27 are responsible for pulling the appropriate data from database 26 and generating/populating each revised spreadsheet 34 with updated data.

Export processing of a revised spreadsheet 34 can be scheduled at any time after the spreadsheet(s) 32 on which the revised spreadsheet 34 depends have been imported and processed. For example, if spreadsheet $S_B(n)$ depends on data only from spreadsheet $S_A(n)$, then $S_B(n)$ can be revised and exported any time after $S_A(n)$ has been imported. Further, if spreadsheet $S_C(n)$ depends on data from both spreadsheet $S_A(n)$ and $S_B(n)$, then $S_C(n)$ can be revised and exported only after both $S_A(n)$ and $S_B(n)$ have been imported and processed. In one illustrative embodiment, all of the revised spreadsheets 34 can be exported at the same time.

As noted, export processing agents 27 are responsible for pulling the appropriate data from database 26 and generating/populating each revised spreadsheet 34 with updated data. As with the import process, determining the data to place in each revised spreadsheet 34, as well as the output format of the spreadsheet, can be handled in any manner. In one illustrative embodiment, control information, such as hard coded control language statements located in the spreadsheets 32, 34 themselves, can be used by the export processing agents 27 to create each revised spreadsheet 34. In general, each revised spreadsheet 34 may have an associated export processing agent 27.

In addition to generating revised spreadsheets 34, export agent control facility 22 may also generate one or more "export only" spreadsheets 38, e.g., $S_X(n+1)$. Export only spreadsheets 38 may for example provide general information or reports of common interest to all entities 30. Thus, each entity can view export only spreadsheets 38, but cannot re-submit them for updating and synchronization.

Synchronization system 18 may also include a version control system 24 that stores a snapshot of each version of each spreadsheet in, e.g., database 28. This thus provides an audit trail to track changes as they occur from revision to revision.

Database 26 provides a centralized location for collecting and storing data associated with each of the spreadsheets 32, 34, and may comprise any type of database application, e.g., DB2, LOTUS NOTES®, etc. By using a centralized database 26, all of the data for all of the spreadsheets can be maintained, updated and controlled from a single data source. Such a database application may also be configured to allow users to view data in database 26 using traditional database viewing tools. In a typical embodiment, such access would be read only and/or be subject to permission rights. Moreover, although shown as a single module, database 26 may be implemented by a plurality of distributed databases.

Common access area 36 provides an easy-to-use interface for the various entities 30, and may be implemented in any manner. Common access area 36 provides controlled storage where entities 30 can upload and retrieve spreadsheets 32, 34, 38. In an illustrative application, common access area 36 can be implemented as a website that is readily available to entities 30. In other applications, common access area 36 may be implemented as a server, bulletin board or email location on a network. Moreover, common access area 36 could be integrated into synchronization system 18.

In an illustrative methodology, entities 30 upload their spreadsheets 32 each night to common access area 36. Because of the nature of the synchronization process, strict timing deadlines may be required for a spreadsheet to participate in synchronization. Once uploaded, spreadsheets 32 would be imported in an order determined by import scheduler 21. As noted above, an order would be predetermined based on dependencies among the spreadsheets 32. Import processing agents 23 determine what data items from the spreadsheets to import to database 26. In addition, data items from the imported spreadsheet may be updated based on data collected from previously imported spreadsheets. For example, a "total cost" data field in entity A's spreadsheet may be updated in database 26 based on line items costs previously imported from entity B's and entity C's spreadsheets.

After all of the spreadsheets 32 are imported and processed, revised spreadsheets 34 can be exported to the common access area 36 as dictated by export scheduler 25, e.g., sometime before the beginning of the next work day. During the export process, each revised spreadsheet 34 is essentially built from scratch by the export processing agents 27, e.g., based on a predetermined set of control language statements. Entities 30 can then download the revised spreadsheets 34 from the common access area 36 at their convenience. This process can thus be implemented cyclically (e.g., daily, weekly, etc.) to meet the particular needs of the project.

Synchronization system 18 may be implemented on any type of computer system 10, including, e.g., a client-server system. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

Figure 2:
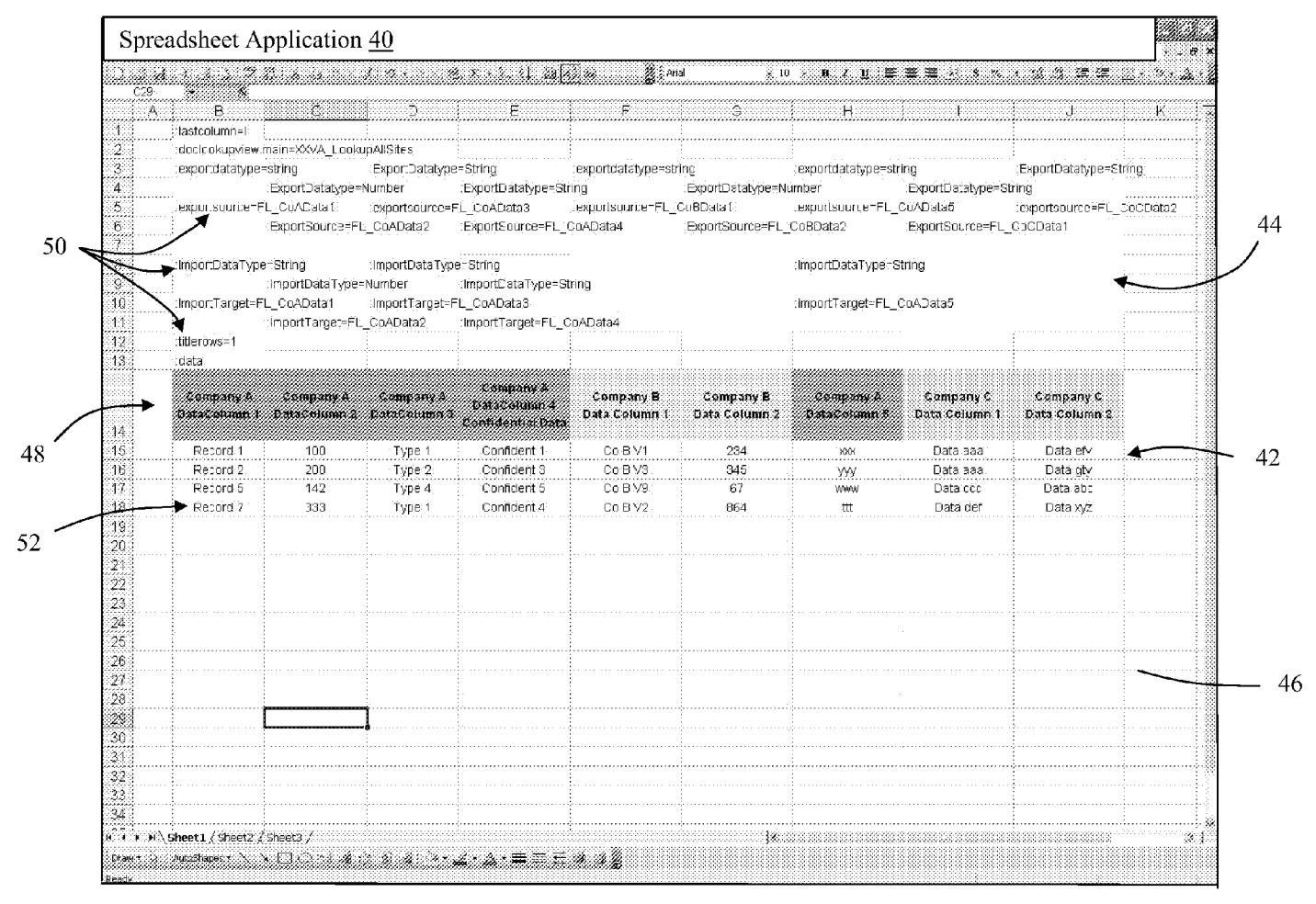

FIG. 2 depicts an example of a spreadsheet application 40 containing spreadsheet data 42 that is configured for synchronization with other sets of spreadsheet data (not shown). In this illustrative embodiment, a spreadsheet interface 46 is shown that not only includes spreadsheet data 42, but also includes a header 44 containing control language statements 50. Control language statements 50 are interpreted by processing agents 23, 27 (FIG. 1) and dictate what information is to be imported from, and exported to, spreadsheet data 42. In one embodiment, control language statements 50 are embedded (i.e., hard coded) into each spreadsheet based on the data requirements of the associated entity.

In this example, data for each record 52 is structured below a plurality of column headers 48. Each column header 48 is associated with a company, i.e., Company A, Company B, Company C, to which the data in that column belongs. Control language statements 50 determine whether a particular column (or row) should be exported, imported, or left unchanged. For instance, if this spreadsheet was being used by Company A, then some or all of the data under the Company A column headers would be tagged for export, modified by Company A if necessary, and then imported. Data under the Company B and Company C headers would only be exported to the spreadsheet and not imported.

By using the control language statements 50, synchronization system 18 can be readily configured to determine what data from a given spreadsheet is to be imported to database 26, and exported from database 26 back to the revised spreadsheet (see FIG. 1). Control language statements 50 also dictate the format of the data, e.g., numerical versus string, location, etc. Note that the embedding of control language statements 50 with the spreadsheet data 42 represents only one possible way of implementing the features of the invention. Accordingly, it should be understood that any technique for determining which data items within a spreadsheet are to be exported, updated or remain unchanged could be utilized.

Note that each row of the spreadsheet data 42 is generally representative of a data record, such as a site, a person, a piece of equipment, etc., and that rows in one spreadsheet are not necessarily the same as rows in another spreadsheet. For example, rows may be sorted differently in the spreadsheets of the different entities; therefore unique processing is required for each spreadsheet when exporting/importing the data. Note also that spreadsheets may contain formulas, e.g., column T times column W equals column Z.

In some cases, columns of information in a spreadsheet might be for reference purposes only and should not be changed or imported to the database 26. Also, an individual updating a spreadsheet might not be aware of the other individuals/parties who may end up referencing the information. Accordingly, confidentiality can be readily maintained among the different entities, i.e., columns of information in one spreadsheet might be confidential and should not be shared with other parties.

It should be appreciated that the teachings of the present invention could be offered as a business method on a subscription or fee basis. For example, a computer system 10 comprising a synchronization system could be created, maintained and/or deployed by a service provider that offers the functions described herein for customers. That is, a service provider could offer to provide spreadsheet synchronization as described herein.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for synchronizing spreadsheet data, comprising:
    selectively importing a portion of a first spreadsheet from a first vendor at a predetermined first import time, the portion of the first spreadsheet being spreadsheet data managed by the first vendor;
    selectively importing a portion of a second spreadsheet from a second vendor at a predetermined second import time later than the predetermined first import time and in response to the importing of the portion of the first spreadsheet, the portion of the second spreadsheet being spreadsheet data managed by the second vendor and including cell data calculated in dependence on the imported portion of the first spreadsheet, wherein the first spreadsheet and the second spreadsheet are two distinct files derived from an original spreadsheet, wherein the second vendor is a separate entity from the first vendor;
    synchronizing the first spreadsheet with the second spreadsheet to obtain a first revised spreadsheet and a second revised spreadsheet;
    providing the first revised spreadsheet to the first vendor at a predetermined first export time; and
    providing the second revised spreadsheet to the second vendor at a predetermined second export time.

2. The method of claim 1, wherein the first spreadsheet and the second spreadsheet contain different data formats and different data.

3. The method of claim 1, wherein synchronizing the first spreadsheet with the second spreadsheet includes updating the spreadsheet data in the second spreadsheet calculated from the spreadsheet data in the first spreadsheet.

4. The method of claim 1, wherein synchronizing the first spreadsheet with the second spreadsheet includes exporting the portion of the second spreadsheet to the first spreadsheet.

5. The method of claim 1, further comprising:
    selectively importing a portion of a third spreadsheet from a third vendor at a predetermined third import time later than the predetermined second import time and in response to the importing of the portion of the second spreadsheet, the portion of the third spreadsheet being spreadsheet data managed by the third vendor and including data calculated from the imported portion of the second spreadsheet;
    synchronizing the third spreadsheet and the second revised spreadsheet to obtain a third revised spreadsheet; and
    exporting the third revised spreadsheet to the third vendor at a third export time.

6. A system for synchronizing spreadsheet data, comprising:
    a scheduling system for scheduling a first import time, a second import time later than the first import time, a first export time and a second export time;
    an import system stored in a memory configured to, when executed by a processor, import spreadsheet data from a common access area, the import system configured for:
        importing a portion of a first spreadsheet from a first vendor at the first import time, the portion of the first spreadsheet being spreadsheet data managed by the first vendor; and
        importing a portion of a second spreadsheet from a second vendor at the second import time in response to the importing of the portion of the first spreadsheet, the portion of the second spreadsheet being spreadsheet data managed by the second entity and including cell data calculated in dependence on the imported portion of the first spreadsheet, wherein the first spreadsheet and the second spreadsheet are two distinct files derived from an original spreadsheet, wherein the second vendor is a separate entity from the first vendor;
    a synchronization system stored in a memory for, when executed by a processor, synchronizing the first spreadsheet and the second spreadsheet to obtain a first revised spreadsheet and a second revised spreadsheet; and
    an export system stored in a memory for, when executed by a processor, providing the first revised spreadsheet to the first vendor at the first export time, and for providing the second revised spreadsheet to the second vendor at the second export time.

7. The system of claim 6, wherein the synchronization system includes a database and the import system imports selected data items from the first spreadsheet and the second spreadsheet into the database.

8. The system of claim 7, wherein the selected data items are determined by at least one import processing agent based on a set of control information associated with each of the first and second spreadsheets.

9. The system of claim 7, wherein the synchronization system updates values for the data in the second revised spreadsheet calculated from values for the data from the first spreadsheet.

10. The system of claim 7, wherein the first and second revised spreadsheets are generated by at least one export processing agent based on a set of control information associated with each of the first and second spreadsheets.

11. The system of claim 6, wherein the scheduling system can be configured to cyclically schedule the first import time, the second import time, the first export time and the second export time.

12. The system of claim 6, wherein the import system further selectively imports portion of a third spreadsheet from a third vendor at a predetermined third import time later than the predetermined second import time and in response to the importing of the portion of the second spreadsheet, the portion of the third spreadsheet being spreadsheet data managed by the third vendor and including data calculated from the imported portion of the second spreadsheet; synchronizes the third spreadsheet and the second revised spreadsheet to obtain a third revised spreadsheet; and exports the third revised spreadsheet to the third vendor at a third export time.

13. A computer program product stored on a computer readable medium for synchronizing spreadsheets, comprising:

program code configured for scheduling a first import time, a second import time later than the first import time, a first export time and a second export time;

program code configured for selectively importing a portion of a first spreadsheet from a first vendor at the first import time, the portion of the first spreadsheet being spreadsheet data managed by the first vendor;

program code configured for selectively importing a portion of a second spreadsheet from a second vendor at the second import time in response to the importing of the portion of the first spreadsheet, the portion of the second spreadsheet being spreadsheet data managed by the second vendor and including cell data calculated in dependence on the imported portion of the first spreadsheet, wherein the first spreadsheet and the second spreadsheet are two distinct files derived from an original spreadsheet, wherein the second vendor is a separate entity from the first vendor;

program code configured for synchronizing the first spreadsheet and the second spreadsheet to obtain a first revised spreadsheet and a second revised spreadsheet; and program code configured for exporting the first revised spreadsheet to the first vendor at the first export time, and for providing the second revised spreadsheet to the second vendor at the second export time.

14. The computer program product of claim 13, wherein the imported portions of the first and second spreadsheets are determined by control information associated with each of the first and second spreadsheets.

15. The computer program product of claim 13, wherein the first and second revised spreadsheets are generated based on control information associated with each of the first and second spreadsheets.

16. The computer program product of claim 13, wherein the program code configured for synchronizing updates values for the data in the second revised spreadsheet calculated from the values of the data from the first spreadsheet.

17. The program product of claim 13, further comprising program code configured for;

selectively importing a portion of a third spreadsheet from a third vendor at a predetermined third import time later than the predetermined second import time and in response to the importing of the portion of the second spreadsheet, the portion of the third spreadsheet being spreadsheet data managed by the third vendor and including data calculated from the imported portion of the second spreadsheet synchronizing the third spreadsheet and the second revised spreadsheet to obtain a third revised spreadsheet; and exporting the third revised spreadsheet to the third vendor at a third export time.

18. A method for deploying a system for synchronizing spreadsheet data, comprising:

providing a computer infrastructure being operable to:

schedule a first import time, a second import time later than the first import time, a first export time and a second export time;

selectively import a portion of a first spreadsheet from a first vendor at the first import time, the portion of the first spreadsheet being spreadsheet data managed by the first vendor;

selectively import a portion of a second spreadsheet from a second vendor at the second import time in response to the importing of the portion of the first spreadsheet, the portion of the second spreadsheet being spreadsheet data managed by the second vendor and including cell data calculated in dependence on the imported portion of the first spreadsheet, wherein the first spreadsheet and the second spreadsheet are two distinct files derived from the original spreadsheet, wherein the second vendor is a separate entity from the first vendor;

synchronize the first spreadsheet and the second spreadsheet to obtain a first revised spreadsheet and a second revised spreadsheet;

export the first revised spreadsheet to the first vendor at the first export time; and export the second revised spreadsheet to the second vendor at the second export time.

* * * * *